United States Patent Office 2,740,772
Patented Apr. 3, 1956

2,740,772

SIDE-CHAIN CRYSTALLINE COPOLYMERS FROM POLYMERIZABLE MONOMERS HAVING A SUBSTITUENT CRYSTALLIZABLE ORGANIC GROUP AND HAVING NO SUBSTITUENT CRYSTALLIZABLE GROUP RESPECTIVELY

Turner Alfrey, Jr., Brooklyn, N. Y., assignor to L. A. Dreyfus Company, Oak Tree, N. J., a company of New York No Drawing. Application December 8, 1949,
Serial No. 131,935

4 Claims. (Cl. 260—86.1)

This invention relates to copolymers and their manufacture and more particularly to copolymers which exhibit dual mechanical properties.

A great many polymers and copolymers have been developed in recent years for utilization in lieu of natural elastomeric materials such as rubber. While a number of such products of satisfactory character and satisfactory methods for producing them, have been developed in the prior art, they are designed for certain utilities and purposes which do not meet the problems in some of the existing arts.

This is true for example in connection with the base materials employed in chewing gum manufacture usually referred to as chewing gum bases. Such chewing gum bases require dual mechanical properties typical of the utilization to which they are put. For example at body temperature and practically 100% relative humidity, the conditions which prevail in the mouth, the chewing base must be soft and "chewy" under the stated conditions. On the other hand, it is desirable that under storage conditions the base should be firm and rather stiff. Or stated somewhat differently, a chewing gum base must a solid substance at room temperature (about 25° C.) and melt at body temperature (37° C.) into a visco-elastic material. While of course there are certain secondary but also important properties such as cohesion, wetting, etc., the particular features emphasized above are basic considerations in connection with such materials.

It has not been possible to achieve the combination of properties necessary in a chewing gum base with an amorphous polymer. Any amorphous polymer whose softening point is sufficiently low for it to exhibit the required properties at body temperature, would also be subject to viscous flow at room temperature and hence would not retain its shape during storage, etc. In commercial chewing gum bases, the desired combination of mechanical properties is achieved by the expedient of using a mixture of several ingredients—one of which is a crystalline resinous material which provides firmness at low temperatures but melts out at slightly elevated temperatures, which crystalline resinous material is incorporated with the rubbery polymer that provides the chief visco-elastic resistance to chew at slightly elevated temperatures. At the present time, chewing gum bases are usually made by combining natural and synthetic polymers with other materials to give the necessary properties. The crystalline substance gives the base firmness at room temperature and low molecular weight polymers contribute to the visco-elastic properties at body temperature. Wetting agents are sometimes added to aid in cohesion.

Accordingly the compounding of chewing gum bases under present practice has become an art peculiar to the individual manufacturer who believes that a particular balance of substances is necessary in order to achieve the particular properties which he thinks is desirable in the chewing gum base. But in all such combinations that are being used, the basic materials require substances of the character set forth which supply different materials to provide the dual and multiple properties necessary in such compositions. Insofar as reliance is placed on natural occurring materials such as rubber, balata, and other natural gums and insofar as natural resinous materials are employed, control of the characteristics of the product is not always simple. In the use of any natural product, variations necessarily occur which may materially affect the characteristics desired in the ultimate product produced. Furthermore sources of supply are not always regular.

Among the objects of the present invention is the production of polymeric materials which exhibit dual or multiple mechanical properties.

Further objects include the production of such polymers synthetically.

Still further objects include the production of polymers and copolymers which exhibit organic chains susceptible to crystallization as side groups attached to or dangling from the polymeric backbone.

Still further objects include methods of producing products of the character set forth above.

Other objects and advantages of the present invention will appear from the further description set forth below, it being understood that such further description is given by way of illustration and explanation only, not by way of limitation, since various changes therein may be made by those skilled in the art without departing from the scope and spirit of the present invention.

In accordance with the present invention, multiple mechanical properties are obtained in polymeric substances by producing polymers or copolymers which possess crystallizable chains attached to or dangling from the polymeric backbone. Such compounds are individual polymers or copolymers which combine a multiplicity of mechanical properties for particular purposes as for example in the production of chewing gum bases and for other purposes. In general polymers having the structure referred to immediately above, behave much more like a mixture of a wax and a rubber than does an ordinary crystalline polymer and also exhibits properties quite different from any amorphous polymer. Below the melting point, the polymers produced in accordance with the present invention exhibit materials laced together into a firm waxy structure by the side chain crystallites but the fact that such crystallization is relegated to the side chains avoids difficulties which arise from the polycrystalline structure of ordinary crystalline polymers.

In general then the products produced in accordance with the present invention may be described as side chain crystalline copolymers produced from a polymerizable monomer having a substituent crystallizable organic group with a polymerizable monomer having no substituent crystallizable group. The invention will be particularly described by the production of copolymers from acrylates and methacrylates in the form of esters, which esters may be described as esters of an acid having the formula $CH_2=CR.COOH$ where R is hydrogen or methyl. At least two types of esters are utilized in the production of the copolymers. Taking the methacrylates for purposes of illustration, one of the monomers is a methacrylate of an alkyl group which is sufficiently long to crystallize and increase the melting point of the copolymer. A second component may then be a methacrylate in the form of an alkyl ester in which the alkyl group is too short to be a crystallizable substituent under the conditions referred to. Methyl methacrylate will particularly illustrate the polymerizable monomer having no substituent crystallizable group while the higher alkyl esters i. e. methacrylates, will be particularly illustrated by alkyl groups having twelve or more carbon atoms of which there will be particularly emphasized for chewing gum base purposes the $C_{14}$ to $C_{18}$ alkyl groups.

The properties of the copolymers produced will of course depend on the particular monomers utilized in producing the copolymer and to some extent on the conditions of polymerization employed. Copolymers may be produced in accordance with the present invention which exists in the form of flowable liquids, viscous materials, semisolid products, tough and rubbery products, products having good visco-elastic properties, and more particularly products eminently suited for utilization as chewing gum bases. However it is pointed out that in the examples given below it is not intended to indicate that all of the copolymers produced in accordance with the present invention have the same properties since they may vary materially for reasons pointed out above.

These side chain crystalline polymers produced in accordance with the present invention have many useful properties due to the presence of the crystallizable organic groups in the side chains attached to the polymeric backbone. They are particularly useful as pointed out above when made from certain limiting materials and under limiting conditions, to the development of chewing gum bases and properties for use in that connection may be used to illustrate the present invention or certain features thereof. Considering materials useful for chewing gum bases it may be stated that: first, the crystallinity of the poly alkyl esters is useful for preparing a polymer which is film and waxy at room temperature but melts below body temperature into an amorphous substance with visco-elastic properties; second, the melting range of ordinary crystalline polymers is dependent on the temperature of crystallization whereas it is believed that side chain crystalline polymers have a melting range less dependent on previous history; third, synthetic polymers produced in accordance with the present invention have side chains which may be varied in length particularly true of the alkyl acrylate and methacrylate polymers; fourth, the length of the side chain determines the melting range of the polymer and the properties of the amorphous form; fifth, copolymers of long chain alkyl esters and methacrylate or methylacrylate for example, place three variables available for utilization in control of properties: (a) the length of the alkyl side chain permits variations as indicated above; (b) the molecular weight of the polymer may be varied by chain transfer agents and since the molecular weight of the polymer influences the viscous flow above the melting temperature, a further factor is thus given for control of the desired properties; (c) the spacings of the alkyl side chains along the backbone may be varied by the polymerizable monomer having no substituent crystallizable group which is employed in producing the copolymer i. e. methyl acrylate or methyl methacrylate for example copolymerized with the long alkyl esters; the spacing of the side chains varies the mechanical properties at room temperature and at body temperature, the closer the side chains the more waxy the polymer, the greater the distance between these chains the more brittle the polymer so that choice of proper monomer ratio will yield a copolymer of desired viscoelastic properties.

In the preparation of polymers and copolymers in accordance with the present invention, a number of examples will be given below. Any type of polymerization procedure may be employed. Thus emulsion polymerization may be carried out using the desired monomers in accordance with the features set forth above, such polymerization being conducted in the presence of water by the utilization of a polymerization catalyst such as benzoyl peroxide, hydrogen peroxide, etc., and usually in the presence of a surface active agent which may be illustrated by "Triton K-60" hereinafter referred to as TK-60 which is a coconut fatty alkyl dimethyl benzyl ammonium chloride (coconut fatty alkyl=alkyl groups present in coconut fatty acids), but is utilized to illustrate various surface active agents that may be employed. The amounts of surface active agent, water, benzoyl peroxide, hydrogen peroxide, or materials commonly used as equivalents for these components may be varied as desired as illustrative examples will be given below. The general practice is to place the stated materials in a sealed vessel in which the polymerization is carried out at any desired temperature as for example up to 100° C. usually with agitation as for example by tumbling the sealed vessel, until polymerization has taken place. The time is also a variable factor and may vary from several hours up to 5 days and more depending on the particular conditions and the particular materials undergoing polymerization. After the reaction has proceeded for the desired time, the tubes or other vessels in which polymerization has been taking place, may be frozen and opened, the polymer washed with water and purified by precipitation in any desired way as in a mixture of solvents and nonsolvents of the usual type. This procedure is fairly exemplary of emulsion polymerization.

Or polymerization with chain transfer agents may be carried out using the desired mole ratios of monomers polymerized with chain transfer agents using benzoyl peroxide as catalyst or other equivalent catalysts may be employed. The same procedure as that set forth above in connection with emulsion polymerization may be utilized but no tumbling is necessary. Nor is it necessary to wash the polymer with water.

Bulk polymerization may be carried out in the manner set forth immediately above for polymerization with chain transfer agents except that the latter are omitted. The following examples will illusrate various types of polymerizations that may be carried out with various materials. The first group includes emulsion polymerizations utilizing various molar ratios of methyl methacrylate to long chain alkyl methacrylates under varying conditions. The second group illustrates bulk polymerization as well as polymerization with chain transfer agents the latter also being in part illustrated in Table I. The second table is particularly concerned with illustrations of bulk polymerization of methyl methacrylate with long chain alkyl methacrylates.

The third group includes emulsion polymerization of various other combinations of monomers including the monomers with non-crystallizable components such as methyl methacrylate, styrene, isoprene, butadiene, methylacrylate, while the long chain or crystallizable esters are illustrated by cetyl acrylate, tetradecyl acrylate, and octadecyl acrylate.

TABLE I
Emulsion polymerization

| | Alkyl | M. M. | A. M. | C. T. A. | B. P. | $H_2O_2$ | $H_2O$ | TK 60 | Time (hr.) |
|---|---|---|---|---|---|---|---|---|---|
| 1 | cetyl | 3.23 | 10.02 | | .03 | .556 | 25 | 0.2 | 16 |
| 2 | do | 1.21 | 3.39 | 3.14 | .03 | .556 | 25 | 0.2 | 48 |
| 3 | do | 1.04 | 3.01 | | .03 | .556 | 25 | 0.2 | 48 |
| 4 | do | 1.047 | 3.11 | (a).15 | .03 | .556 | 25 | 0.2 | 24 |
| 5 | do | 1.035 | 3.33 | (a).5 | .03 | .556 | 25 | 0.2 | 19 |
| 6 | do | 1.065 | 3.016 | (a)1.0 | .03 | .556 | 25 | 0.2 | 19 |
| 7 | do | 2.142 | 3.0 | | .03 | .556 | 25 | 0.2 | 19 |
| 8 | do | 1.119 | 3.09 | (b).076 | .03 | .556 | 25 | 0.2 | 24 |
| 9 | do | 1.008 | 3.016 | (b)1.61 | .03 | .556 | 25 | 0.2 | 19 |
| 10 | octadecyl | 2.0 | 3 | | .05 | .556 | 25 | 0.2 | 24 |
| 11 | do | .89 | 3 | | .05 | .556 | 25 | 0.2 | 24 |
| 12 | do | .45 | 3 | | .05 | .556 | 25 | 0.2 | 24 |
| 13 | do | .89 | 3 | | .05 | .556 | 25 | 0.2 | 24 |

M. M.=methyl methacrylate.
A. M.=alkyl methacrylate.
C. T. A.=chain transfer agent.
B. P.=benzoyl peroxide.
TK60="Triton K60."
Parts by weight.
All C. T. A.=$CCl_4$ except as noted.
(a) =$CBr_4$.
(b) =dicyclopentadiene.

TABLE II
Bulk polymerization

| | Alkyl | M. M. | A. M. | B. P. | C. T. A. | Time (hrs.) |
|---|---|---|---|---|---|---|
| 14 | octadecyl | 8.45 | 28.5 | .5 | 19 | 48 |
| 15 | do | 3.0 | 10.0 | .15 | 15 | 24 |
| 16 | do | 3.0 | 10.0 | .15 | 18 | 48 |
| 17 | do | 15.0 | 50.0 | .83 | 46 | 48 |
| 18 | do | 15.0 | 50.0 | .83 | 7.5 | 48 |
| 19 | do | 14 | 47 | .83 | 50 | 24 |
| 20 | do | 12 | 39 | .7 | 60 | 120 |
| 21 | do | 16 | 53 | .83 | 75 | 120 |
| 22 | do | 13 | 45 | .8 | 70 | 120 |
| 23 | do | 12 | 40 | .8 | 65 | 72 |
| 24 | do | 13 | 44 | .8 | 78 | 72 |
| 25 | do | 13 | 45 | .8 | 90 | 72 |
| 26 | do | 7 | 10 | .15 | | 96 |
| 27 | do | 4.5 | 10 | .15 | | 96 |
| 28 | do | 2.0 | 10 | .15 | | 96 |
| 29 | do | 1.3 | 10 | .15 | | 96 |
| 30 | do | 3.0 | 10 | .15 | 18 | 96 |
| 31 | cetyl | 1.18 | 5.06 | .006 | | 4.5 |
| 32 | do | 2.30 | 5.10 | .0074 | | 4.5 |
| 33 | do | 1.008 | 3.20 | .03 | 3.21 | 16 |
| 34 | do | 1.015 | 3.044 | .03 | 4.957 | 16 |
| 35 | do | 1.044 | 3.107 | .03 | (D.C.P.).433 | 16 |
| 36 | do | 16 | 50 | .83 | 33 | 24 |
| 37 | do | 16 | 50 | .83 | 66 | 24 |
| 38 | do | 16 | 50 | .83 | 16.5 | 25 |
| 39 | lauryl | 1.18 | 5.06 | .05 | | 21.5 |

M. M.=methyl methacrylate.
A. M.=alkyl methacrylate.
B. P.=benzoyl peroxide.
C. T. A.=chain transfer agent.
D. C. P.=dicyclopentadiene.
All parts by weight.
All C. T. A.=$CCl_4$ except as indicated.

TABLE III
Emulsion polymerization

| | Short chain | | Long chain | | Time (Hrs.) |
|---|---|---|---|---|---|
| 40 | M. M. | 3.73 | C. A. | 10.20 | 16 |
| 41 | M. M. | 10.34 | | 14.00 | 52 |
| 42 | M. M. | 2.14 | | 10.20 | 52 |
| 43 | Sty. | 3.66 | | 10.05 | 52 |
| 44 | Iso. | 2.30 | | 10.17 | 48 |
| 45 | But. | 1.76 | | 10.26 | 108 |
| 46 | | 3.69 | | 5.08 | 24 |
| 47 | | 1.06 | | 5.04 | 24 |
| 48 | | 0.791 | | 3.005 | 19 |
| 49 | | 2.21 | | 9.48 | 19 |
| 50 | M. A. | 2.91 | T. A. | 10.16 | 19 |
| 51 | Iso. | 1.13 | | 5.08 | 19 |
| 52 | | 2.13 | O. A. | 3.05 | 72 |
| 53 | | .415 | | 3.01 | 72 |

M. M.=methyl methacrylate.
M. A.=methyl acrylate.
Sty.=styrene.
Iso.=isoprene.
But.=butadiene.
C. A.=cetyl acrylate.
T. A.=tetradecyl acrylate.
O. A.=octadecyl acrylate.
TK60="Triton K60."
All parts by weight. All emulsifications with .03 pt. of benzoyl peroxide, .556 pt. of $H_2O_2$, 25 parts $H_2O$, .5 pt. TK60.

As indicated above a wide variety of different types of products may be produced varying in physical characteristics from liquids to hard brittle solids, tough solids, etc. It is possible to produce materials having the desired visco-elastic properties and other characteristics necessary for chewing gum base materials by careful control of the monomers employed in accordance with this invention. For chewing gum bases it is preferred to utilize methyl methacrylate as the short chain monomer copolymerized with long chain alkyl methacrylates particularly those having a chain in the long chain esters of from 14 to 18 carbon atoms. Thus the copolymers produced under Table II in examples 14–30 are particularly useful in the production of chewing gum bases, that of example 16 being most desirable. In these combinations for chewing gum bases the ratio of monomers employed should be a molar ratio between 1:2 to 2:1 of short chain monomer to long chain monomer and ratios of monomers of this character utilizing methyl methacrylate as the short chain monomer and the alkyl methacrylates in which the alkyl group has from 14 to 18 carbon atoms as the long chain monomers give particularly desirable chewing gum bases when the monomers are used in the preferred ratios of 1:2 to 2:1. The molar ratio should desirably be 1:1 to 1:2 of methyl methacrylate to $C_{14}$ to $C_{18}$ alkyl acrylate or methacrylate for chewing gum bases. For other purposes not as exacting as chewing gum base use or where other properties are desired, the ratios of the monomers may vary both with respect to the acrylates and methacrylates referred to as well as other types of polymerizable monomers employed. The wider range may be of any desired ratios of monomers and may for example be from 1:9 to 9:1 moles or even wider ranges may be employed.

In producing side chain crystalline copolymers, the examples given above particularly emphasize the use of methacrylates and acrylates of long chain and short chain alkyls but also exemplify in Table III combinations of styrene with long chain acrylates, of isoprene with long chain acrylates, and butadiene with long chain acrylates. Various other possible combinations may be utilized of a polymerizable monomer having a substituent crystallizable organic group with a polymerizable monomer having no substituent crystallizable group. Thus, p-alkyl styrenes and p-acyloxystyrenes may be used as monomers with other monomers having the example conjugated unsaturation such as butadiene, isoprene, etc. The copolymers of p-acyloxystyrenes with butadiene for example, may be used in making chewing gum bases. Similarly, vinyl esters may be employed in making copolymers. For example, long chain containing esters such as vinyl esters of long chain fatty acids, i. e. vinyl stearate may be copolymerized with vinyl esters or allyl esters of short chain fatty acids, i. e. vinyl acetate or allyl acetate. The considerations given above for methacrylate and acrylate copolymers apply to these cases also, including proportions of monomers, conditions of polymerization including temperature, chain transfer agents, catalysts, surface active agents, etc. all as given hereinabove.

While two types of monomers have been referred to above to produce a side chain crystalline copolymer, mixtures of these various monomers from each of the groups may be employed. In addition, adjuvants may be included in the reaction mixtures to modify the properties of the copolymers produced, and such adjuvants may be polymerizable or non-polymerizable.

A very desirable adjuvant of this type is illustrated in the acids; methacrylic and acrylic acids either of which may be desirably included in the mixtures undergoing copolymerization. Their inclusion improves the cohesive properties of the copolymer and they act in the same way as a wetting agent. They may be included in the reaction mixture in the same way as other monomers, but in minor amounts, as for example from ½ to 5%, and higher such as up to 10%, based on the weight of the other monomers. Any of the exemplified combinations given above may be modified by the inclusion of these adjuvants.

The chain transfer agents have been exemplified above but a wide variety, as those known in the art, may be employed. Besides those given in the examples there may be mentioned brom trichloromethane, mercaptans for example dodecylmercaptan and tetradecylmercaptan, ethers such as dibutylether, allyl acetate, 1.4 pentadiene etc. The amount of chain transfer agent may vary and sufficient should be used to give the desired chain length desired. Various ratios are shown in the examples. And to further illustrate ratios, using carbon tetrachloride for exemplary purposes, the ratio of chain transfer agent to monomers (combined) may be quite appreciable, as for example 1:1. In other cases the ratio may be as low as 1:100 and neither of these ratios is limiting since it depends on the monomers and the conditions.

In addition to the surface active agents as given above, it may be pointed out that in general various types may be utilized including both cationic and anionic varieties. Specific classes include the esters of the ethanolamines, quaternary salts of fatty amines, sulfate esters, sulfonic esters, etc. all of which and many more, are well known in the art. Nor are the proportions employed to be limited to those given in the examples. They may vary quite substantially.

As catalysts, those given in the examples illustrate the catalytic agents commonly employed in these polymerization procedures, in addition to which there may be mentioned organic peroxides such as lauroyl peroxide, cumene hydroperoxide, ditertiary butyl peroxide, per-compounds such as potassium persulfate, 2,2' azo bis isobutyro nitrile etc. The proportions of catalysts are also exemplified in the tabulated examples. Such proportions are generally not critical and may be varied within substantial figures.

Having thus set forth my invention, I claim:

1. A chewing gum base side chain crystalline copolymer having dual properties of base firmness due to a firm waxy structure at room temperature and visco elastic properties at body temperature, of methyl methacrylate with a $C_{14}$ to $C_{18}$ alkyl ester of an acid having the formula $CH_2=CR.COO.H$ where R is selected from the group consisting of hydrogen and methyl, the molar ratio of methyl methacrylate to $C_{14}$ to $C_{18}$ alkyl ester being from 1:1 to 1:2.

2. The method of making a chewing gum base side chain crystalline copolymer having dual properties of base firmness due to a firm waxy structure at room temperature and viscoelastic properties at body temperature, which comprises heating at a temperature not above 100° C. in the presence of carbon tetrachloride, methyl methacrylate with a $C_{14}$ to $C_{18}$ alkyl ester of an acid having the formula $CH_2=CR.COO.H$ where R is selected from the group consisting of hydrogen and methyl, the molar ratio of methyl methacrylate to $C_{14}$ to $C_{18}$ alkyl ester being from 1:1 to 1:2.

3. A chewing gum base side chain crystalline copolymer having dual properties of base firmness due to a firm waxy structure at room temperature and visco elastic properties at body temperature, of methyl methacrylate with octadecyl methacrylate, the molar ratio of methyl methacrylate to octadecyl methacrylate being from 1:1 to 1:2.

4. A chewing gum base side chain crystalline copolymer having dual properties of base firmness due to a firm waxy structure at room temperature and visco elastic properties at body temperature, of methyl methacrylate with cetyl methacrylate, the molar ratio of methyl methacrylate to cetyl methacrylate being from 1:1 to 1:2.

References Cited in the file of this patent

UNITED STATES PATENTS

| Number | Name | Date |
|---|---|---|
| 2,097,263 | Strain | Oct. 26, 1937 |
| 2,101,061 | Gordon | Dec. 7, 1937 |
| 2,118,864 | Reppe et al. | May 31, 1938 |
| 2,125,885 | Bruson | Aug. 9, 1938 |
| 2,129,662 | Barrett et al. | Sept. 13, 1938 |
| 2,189,734 | Kistler et al. | Feb. 6, 1940 |
| 2,407,954 | Fenske et al. | Sept. 17, 1946 |
| 2,419,090 | Rainard | Apr. 15, 1947 |
| 2,600,446 | Van Horne et al. | June 17, 1952 |
| 2,604,453 | Popkin | July 22, 1952 |

FOREIGN PATENTS

| 492,734 | Great Britain | 1938 |
|---|---|---|

OTHER REFERENCES

Bawn: The Chemistry of High Polymers, pub. by Interscience Pub. Inc., New York, 1948, pages 47–54.

Modern Plastics, September 1947, pages 128–129.

Serial No. 397,138, Fikentscher et al. (A. P. C.), published May 11, 1943.